(12) United States Patent
Scholle et al.

(10) Patent No.: US 9,631,709 B2
(45) Date of Patent: Apr. 25, 2017

(54) HYBRID DRIVE DEVICE FOR A MOTOR VEHICLE

(71) Applicant: Audi AG, Ingolstadt (DE)

(72) Inventors: Tassilo Scholle, Ingolstadt (DE); Frank Vollmer, Ingolstadt (DE); Steffen Hummel, Ingolstadt (DE); Christian Meixner, Ingolstadt (DE); Jörg Müller, Chemnitz (DE); Rico Resch, Chemnitz (DE); Mirko Leesch, Gelenau (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/913,249

(22) PCT Filed: Aug. 1, 2014

(86) PCT No.: PCT/EP2014/002129
§ 371 (c)(1),
(2) Date: Feb. 19, 2016

(87) PCT Pub. No.: WO2015/024629
PCT Pub. Date: Feb. 26, 2015

(65) Prior Publication Data
US 2016/0201769 A1 Jul. 14, 2016

(30) Foreign Application Priority Data

Aug. 21, 2013 (DE) ......................... 10 2013 013 947

(51) Int. Cl.
*F16H 3/72* (2006.01)
*B60K 6/365* (2007.10)
(Continued)

(52) U.S. Cl.
CPC ............. *F16H 3/725* (2013.01); *B60K 6/365* (2013.01); *B60K 6/387* (2013.01); *B60K 6/48* (2013.01);
(Continued)

(58) Field of Classification Search
CPC ...................................................... F16H 3/725
See application file for complete search history.

(56) References Cited

U.S. PATENT DOCUMENTS 8,556,053 B2  10/2013  Jakobi-Bodenhagen et al.
8,727,927 B2   5/2014  Meixner
(Continued)

FOREIGN PATENT DOCUMENTS

DE  102012214266   2/2013
DE  102013005949  10/2013
(Continued)

OTHER PUBLICATIONS

International Search Report issued by the European Patent Office in International Application PCT/EP2014/002129 on Sep. 9, 2014.

*Primary Examiner* — Derek D Knight
(74) *Attorney, Agent, or Firm* — Henry M. Feiereisen LLC.

(57) ABSTRACT

A hybrid drive device for a motor vehicle includes an internal combustion engine, an electric machine, and two planetary gear trains which are shiftable into different gear stages by shifting elements and brakes and which are connectable via input elements and output elements with a driven input shaft and an output shaft and have reaction elements which can be coupled or braked. The internal combustion engine is in driving relation to a first input shaft and the electric machine is in driving relation to a second coaxial input shaft. The two planetary gear trains are coupled to each other such that via the clutches and brake shifting of four forward gears can be implemented via the internal combustion engine and shifting of three forward gears or reverse gears can be implemented via the electric machine.

5 Claims, 2 Drawing Sheets

(51) Int. Cl.
  *F16D 21/02* (2006.01)
  *B60K 6/387* (2007.10)
  *B60K 6/48* (2007.10)
  *B60K 6/547* (2007.10)

(52) U.S. Cl.
  CPC .............. *B60K 6/547* (2013.01); *F16D 21/02* (2013.01); *B60K 2006/4816* (2013.01); *B60Y 2200/92* (2013.01); *B60Y 2400/73* (2013.01); *F16H 2200/0043* (2013.01); *F16H 2200/2007* (2013.01); *F16H 2200/2043* (2013.01); *Y02T 10/6221* (2013.01); *Y02T 10/6256* (2013.01); *Y10S 903/911* (2013.01)

(56) References Cited

U.S. PATENT DOCUMENTS

| | | |
|---|---|---|
| 2007/0275808 A1 | 11/2007 | Iwanaka et al. |
| 2011/0136608 A1 | 6/2011 | Kim et al. |
| 2011/0300983 A1 | 12/2011 | Kurokawa |
| 2013/0017921 A1 | 1/2013 | Meixner |
| 2013/0045826 A1 | 2/2013 | Wittkopp et al. |
| 2013/0056323 A1 | 3/2013 | Jakobi-Bodenhagen et al. |

FOREIGN PATENT DOCUMENTS

| | | |
|---|---|---|
| FR | 2 952 590 | 5/2011 |
| WO | WO 2013/083337 | 6/2013 |

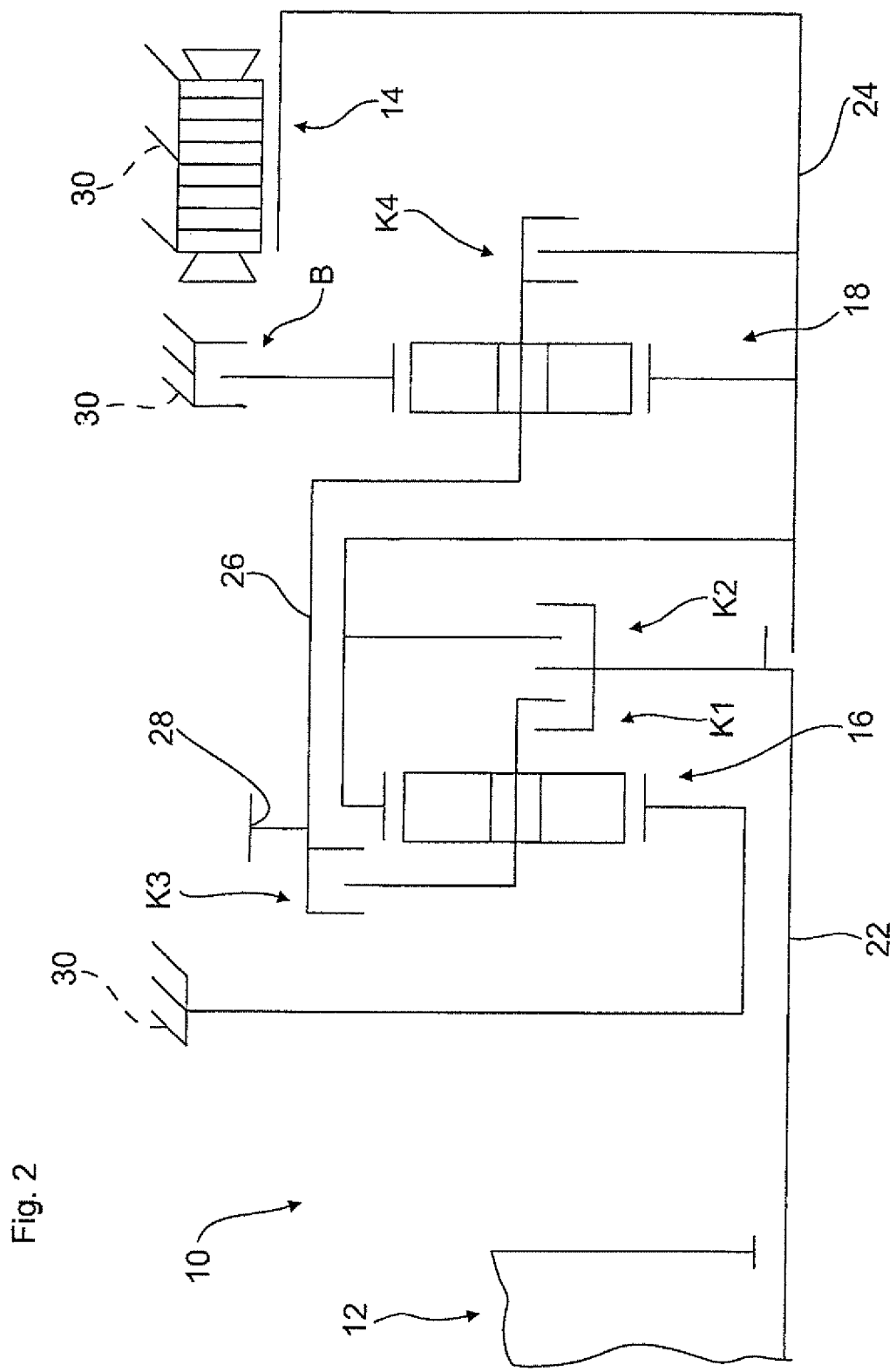

HYBRID DRIVE DEVICE FOR A MOTOR VEHICLE

CROSS-REFERENCES TO RELATED APPLICATIONS

This application is the U.S. National Stage of International Application No. PCT/EP2014/002129, filed Aug. 1, 2014, which designated the United States and has been published as International Publication No. WO 2015/024629 and which claims the priority of German Patent Application, Serial No. 10 2013 013 947.3, filed Aug. 21, 2013, pursuant to 35 U.S.C. 119(a)-(d).

BACKGROUND OF THE INVENTION

The present invention relates to a hybrid drive device for a motor vehicle.

A hybrid drive device of the generic type is disclosed, for example, in US 2011/0136608 A1 and includes as power sources an internal combustion engine and an electric machine in driving relation, separately or together, to a transmission having several gear stages. The transmission is hereby formed by two planetary gear trains which are coupled with one another and can be shifted by several brakes and clutches and which are coaxially aligned with the two driving transmission input shafts. The use of planetary gear trains enables a short and compact construction of the hybrid drive device, so that, for example, a transverse installation is possible in motor vehicles. The arrangement of the electric machine should also be such that in addition to its driving function, a use thereof as a generator to produce power and, optionally, as a starter for the internal combustion engine becomes possible and also to realize a reverse gear when reversing the rotation direction.

SUMMARY OF THE INVENTION

The object of the invention is to provide a hybrid drive device which is simpler in structure and more compact and permits greater degrees of freedom in addition to beneficial gear ratios in terms of the transmission.

According to one aspect of the invention, the object is achieved by a hybrid drive device for a motor vehicle, including an internal combustion engine, an electric machine, and two planetary gear trains which are coupled to one another and shiftable into different gear stages by shifting elements and brakes and which are connectable via input elements and output elements with a driven input shaft and an output shaft and have reaction elements which can be coupled or braked, wherein the internal combustion engine is in driving relation to a first input shaft and the electric machine is in driving relation to a second coaxial input shaft, and wherein the two planetary gear trains are coupled to one another such that via the clutches and brakes four forward gears can be shifted via the internal combustion engine and three forward and/or reverse gears can be shifted via the electric machine. This results in a particularly beneficial operational capability in both the combustion engine drive with acceptable gear steppings and wide transmission spacing, and the electromotive drive for the lower and middle speed range of the motor vehicle. By reversing the rotation direction of the electric machine, the reverse gears can be formed.

Advantageous refinements and configurations of the invention are set forth in the dependent claims.

According to an advantageous refinement of the invention, a drive-through of the internal combustion engine to the electric machine can be controlled via actuation of only one clutch in the absence of a driving connection, so that, for example, the internal combustion engine can be started by the electric machine and/or the traction battery of the motor vehicle can be charged by the internal combustion engine. As an alternative, the drive-through drive from the internal combustion engine to the electric machine can also be realized via a correspondingly switched gear stage.

In terms of construction and control, the two planetary gear trains can, advantageously, be shifted by four clutches and a housing-fixed brake.

For this purpose, using a first and a second clutch on the input shaft on the side of internal combustion engine either the spider of the first planetary gear train or the input shaft of the electric machine or the ring gear of the first planetary train can be connected via with the input shaft on the side of the internal combustion engine.

In terms of installation space, both said clutches can be, advantageously, configured as double clutch, which can be arranged axially behind one another or radially above one another.

Furthermore, the first planetary gear train can have a housing-fixed sun gear, the spider connectable with the output shaft via a third clutch, and a ring gear, with the ring gear being fixedly connected to the input shaft of the electric machine.

Furthermore, the input shaft of the electric machine can carry the sun gear of the second planetary gear train, the spider thereof being firmly coupled with the output shaft, and the ring gear thereof being connectable via a fourth clutch to the input shaft of the electric machine and brakeable against the housing via a brake.

To realize a transmission design with beneficial efficiency and gear spacing, the two planetary gear trains can be configured as a negative-ratio gear train, preferably with a stationary gear ratio $i_0$ of the negative-ratio gear train on the side of the internal combustion engine of −1.65, and the second negative-ratio gear train of −1.95.

BRIEF DESCRIPTION OF THE DRAWING

Two exemplary embodiments of the invention are illustrated hereinafter with further details. The drawing, depicting half-sided block diagrams, shows in:

FIG. 2 a hybrid drive device as an alternative to FIG. 1 with modified arrangement of the double clutch and modified connection of the clutch between the drive shaft of the electric machine and the planetary gear train.

DETAILED DESCRIPTION OF PREFERRED EMBODIMENTS

Figure 1:
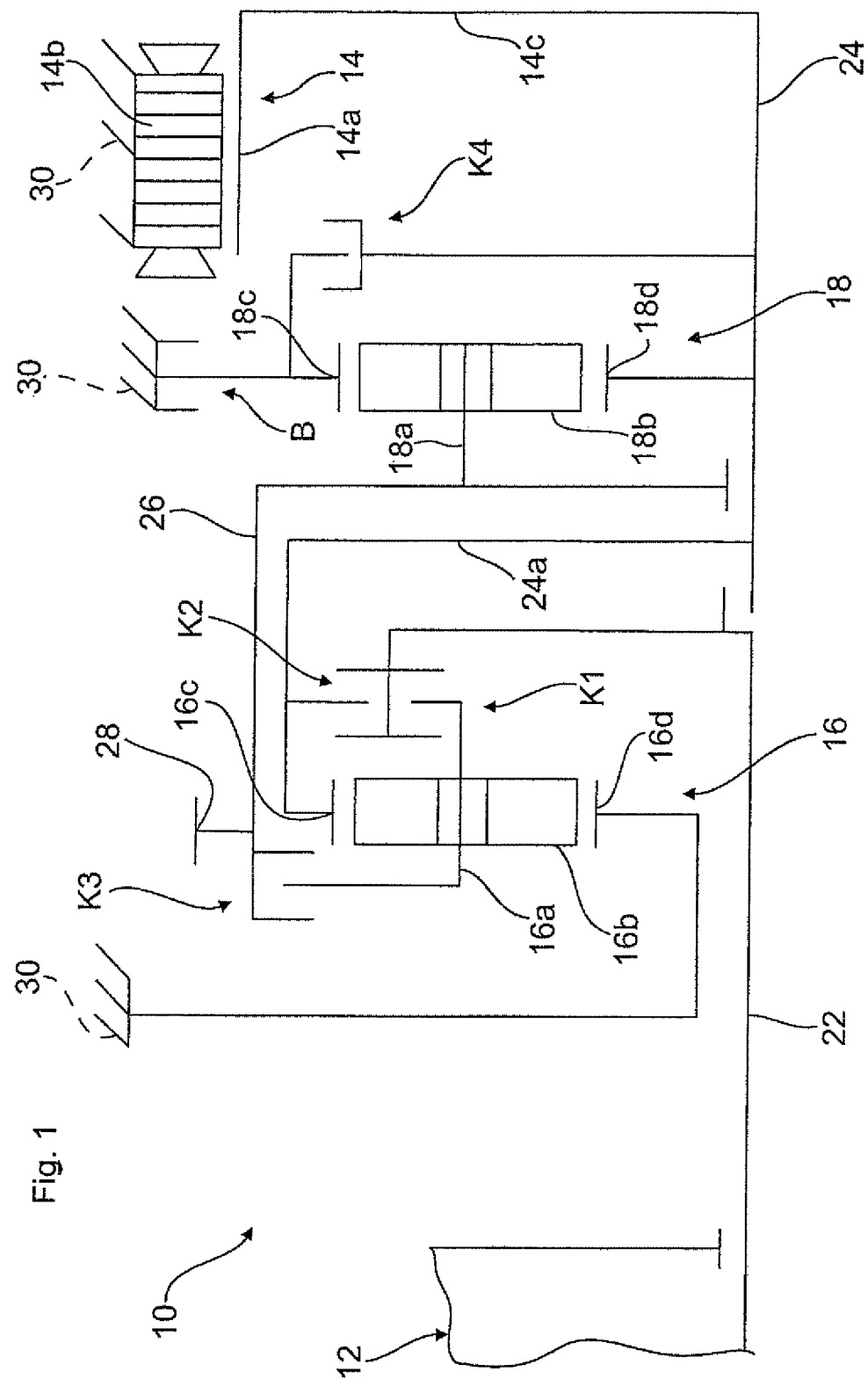
FIG. 1 a hybrid drive device for motor vehicles, including a driving internal combustion engine, an electric machine, and two planetary gear trains coupled to one another, with the gear stages being shiftable via a double clutch, two further clutches, and a brake.

FIG. 1 illustrates a hybrid drive device 10 for motor vehicles, which is comprised essentially of an internal combustion engine 12, only hinted here, an electric machine 14, and two planetary gear trains 16, 18.

The internal combustion engine 12 can act with interposition of a torsional vibration damper or a dual mass flywheel upon a first input shaft 22, whereas the electric machine 14 is in driving relation to a second coaxial input shaft 24. 26 designates an output shaft which is drivingly connected, for example via a gear 28 and via further, not shown transmission elements with an axle differential of the motor vehicle.

The electric machine 14 can be configured, as illustrated, in hollow shaft construction, wherein the rotor 14a and the preferably housing-fixed stator 14b can be positioned more or less about the planetary gear train 18, and the rotor 14a can be in driving relation to the input shaft 24 via a flange 14c. The electric machine 14 may also be placed directly onto the input shaft 24.

The input shaft 22 on the side of the internal combustion engine drives via a clutch K1 either the spider 16a of the planetary gear train 16 that supports the planet gears 16b, or via a clutch K2 the ring gear 16c of the planetary gear train 16, with the ring gear 16c being fixedly connected by a connection flange 24a to the input shaft 24.

The clutches K1 and K2 are constructed as double clutch and arranged radially above one another to realize an axially short construction.

The sun gear 16d of the planetary gear train 16 is firmly supported upon the housing 30 (only indicated by dashed lines), while the spider 16a can be coupled via a third clutch K3 to the output shaft 26.

The sun gear 18d of the second planetary gear train 18 is fixedly arranged on the second input shaft 24 and drivingly connected via the planetary gears 18b to the spider 18a, wherein the ring gear 18c thereof can either be braked via a housing-fixed brake B or coupled via a fourth clutch K4 with the input shaft 24. The spider 18a is furthermore firmly connected in driving relation to the output shaft 26.

The described coupling of the two planetary gear trains 16, 18 between the input shafts 22, 24 and the output shaft 26 enables shifting, as described hereinafter, of four forward gears in the combustion engine drive and three forward gears in the electromotive drive, and a connection without drive between the internal combustion engine 12 and the electric machine 14, with the clutches K1 to K4 and the brake B being activated as follows:

| Internal combustion engine 12 | forward gear 1 | K2 B |
| | forward gear 2 | K2, K3 |
| | forward gear 3 | K2, K4 |
| | forward gear 4 | K4, K1 |
| Electric machine 14 | forward gear 1 | B |
| | forward gear 2 | K3 |
| | forward gear 3 | K4 |
| Connection without drive between ICE and EM | | K1 (i = 1.6) |
| or | | K2 (i = 1.0) |

The planetary gear trains 16, 18 are configured in terms of gear ratio as negative-ratio gear train, with a stationary gear ratio $i_0$ of −1.65 of the planetary gear train 16 and a stationary gear ratio of $i_0$ of −1.95 of the planetary gear train 18.

Actuation of the clutches K1 to K4 and the brake B can be implemented hydraulically and/or electrically in a manner known per se, wherein the shifting elements can be configured preferably as multi-disk clutches. Furthermore, when the combustion engine is in the operating mode, the drive torque of the electric machine 14 can be superimposed or added (boost mode) in the three forward gears through appropriate control.

FIG. 2 shows the hybrid drive device 10, which is substantially of identical structure to FIG. 1, with a modified double clutch, in which the clutches K1 and K2 are axially connected behind one another. In addition, a modified connection of the clutch K4 is shown, which couples the drive shaft 24 of the electric machine with the spider of the planetary gear train 18.

While the radially superimposed clutches K1, K2 (FIG. 1) require less space axially, the axially aligned arrangement requires less installation space in the radial direction, which may be of advantage, where appropriate, for positioning an electric machine 14 in hollow shaft construction.

The electric machine 14 can, optionally, also be arranged between the internal combustion engine 12 and the planetary gear train 16 and connected via a hollow shaft as an input shaft 24 to the planetary gear train 18. The planetary gear trains 16, 18 could hereby be positioned as mirror image of one another such that the planetary gear train 18 is again directly axially adjacent to the electric machine 14.

The clutch K2 or the brake B may serve or respectively be configured as starting element for the combustion engine.

The invention claimed is:

1. A hybrid drive device for a motor vehicle, comprising:
a first input shaft;
a second input shaft disposed in coaxial relationship to the first input shaft;
a common output shaft;
an internal combustion engine in driving relation to the first input shaft;
an electric machine in driving relation to the second input shaft; and
first and second planetary gear trains shiftable into different gear stages, wherein reaction elements of the first and second planetary gear trains can be coupled or braked, said first planetary gear train including a housing-fixed sun gear, a spider, and a ring gear which is fixedly connected to the second input shaft, said second planetary gear train including a sun gear fixedly connected to the second input shaft, a spider fixedly connected to the output shaft, and a ring gear,
said first and second planetary gear trains being coupled to each other with four clutches and a housing-fixed brake of four forward gears, with a first one of the clutches being capable to connect the spider of the first planetary gear to the first input shaft, with a second one of the clutches being capable to connect the ring gear of the first planetary gear with the first input shaft, with a third one of the clutches being capable to connect the spider of the first planetary gear to the output shaft, and with a fourth one of the clutches being capable to connect the ring gear of the second planetary gear with the second input shaft or to connect the spider of the second planetary gear with the second input shaft,
said brake being configured to brake the ring gear of the second planetary gear train.

2. The hybrid drive device of claim 1, wherein a through-drive from the internal combustion engine to the electric machine is controllable without a drive connection via actuation of the first or second one of the clutches, with the first clutch realizing a different gear transmission ratio than the second clutch between the internal combustion engine and the electric machine, such that a lack of the drive connection between components associated with the first or second clutches is established.

3. The hybrid drive device of claim 1, wherein the first and second clutches form a double clutch, with the first and second clutches being arranged axially behind one another.

4. The hybrid drive device of claim 1, wherein the first and second clutches form a double clutch, with the first and second clutches being arranged radially above one another.

5. The hybrid drive device of claim 1, wherein the first and second planetary gear trains are each configured as a negative-ratio gear train.

* * * * *